No. 689,994. Patented Dec. 31, 1901.
W. R. SPOONER.
MULTIPLYING ATTACHMENT FOR CAMERAS.
(Application filed Mar. 2, 1901.)
(No Model.)

WITNESSES:
Kate M. Hilton
Agnes E. Rogers

INVENTOR:
William Reed Spooner

UNITED STATES PATENT OFFICE.

WILLIAM REED SPOONER, OF NEW YORK, N. Y.

MULTIPLYING ATTACHMENT FOR CAMERAS.

SPECIFICATION forming part of Letters Patent No. 689,994, dated December 31, 1901.

Application filed March 2, 1901. Serial No. 49,549. (No model.)

*To all whom it may concern:*

Be it known that I, WILLIAM REED SPOONER, a citizen of the United States, residing at New York, (Manhattan,) in the county of New York and State of New York, have invented certain new and useful Improvements in Multiplying Attachments for Cameras, of which the following is a specification.

My invention relates to what is known or termed as "multiplying cameras;" and my object is to combine in simple and accurate arrangement certain parts whereby more efficient and convenient operation can be attained, which I accomplish by the construction illustrated in the accompanying drawings, in which—

Figure 1:
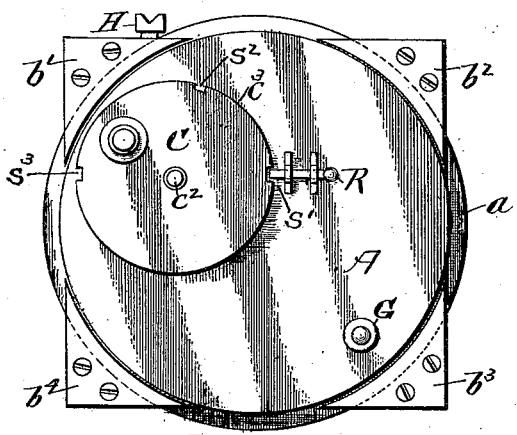
Figure 2:
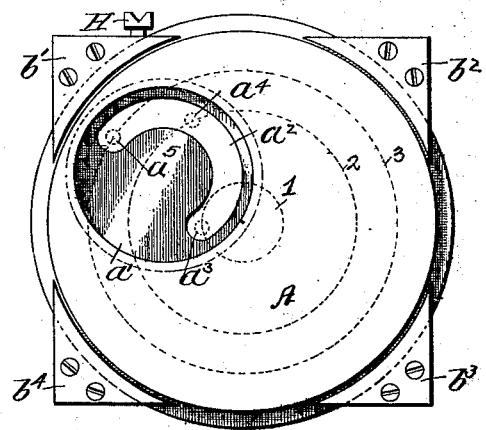
Figure 3:
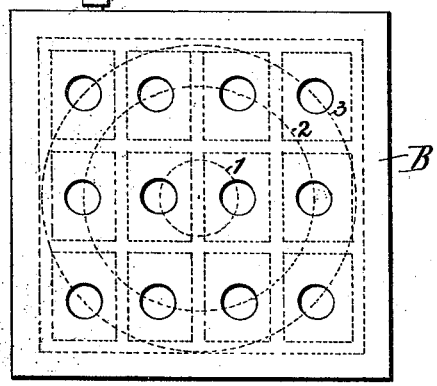
Figure 4:
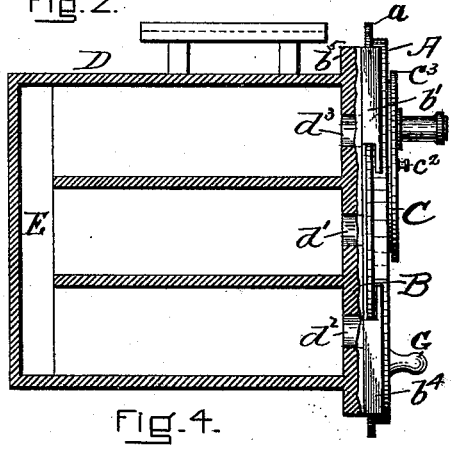
Figure 5:
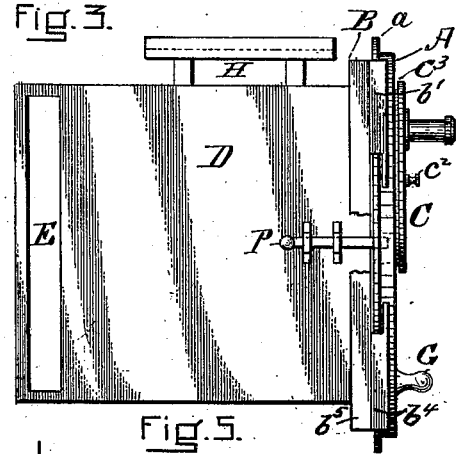
Figure 6:
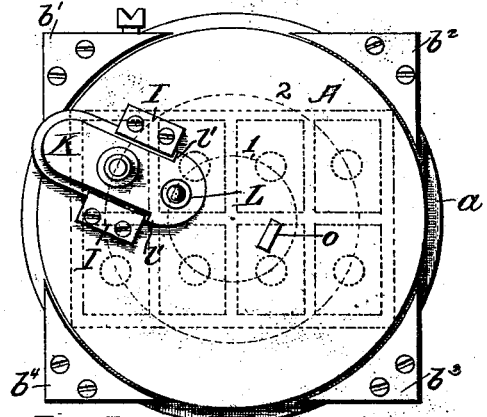

Figure 1 is a view in elevation of the front of my camera arranged for twelve separate exposures upon one surface. Fig. 2 is another view of same with certain parts removed to expose details. Fig. 3 is an end view in elevation of Fig. 1 with front removed to expose further details and showing internal end view of compartments in dotted lines. Fig. 4 is a longitudinal sectional view to correspond with Fig. 1. Fig. 5 is a complete longitudinal external side view in elevation to correspond with Fig. 1; and Fig. 6 is a front view in elevation of an eight-compartment camera, showing modified construction and compartments outlined by dotted lines.

The same characters of reference indicate identical parts in all the views.

To provide a camera with which a number of views can be successively taken upon a single plate, film, or surface at indefinite intervals of time by simple and exact manipulation, I divide the camera-box into the desired number of longitudinal compartments, cells, or passages for transmission of light and having a revolving disk front upon which a lens is adjustably secured whereby the revolution of said front will successively aline said lens with a certain number of said compartments or light-passages and then by shifting or adjusting the lens to a different position upon the revolving front alinement can be effected with other of said compartments.

In Fig. 1, A is the revolving front, provided with a rabbeted edge or lip $a$ upon its periphery, which is adapted to fit and turn beneath the corner-plates $b'$ $b^2$ $b^3$ $b^4$, which plates are secured by screws or otherwise to the corners of the camera frame or box and serve as guides to afford a secure bearing, whereby said revolving front is held in position and may be rotated with perfect accuracy. C is a lens-carrying holder or disk preferably adapted to fit within a counterbore or circular space $a'$ upon and within the main disk A, as shown in Fig. 2, and revolves securely upon its axis at $c^2$. The periphery of the disk C forms a lip $c^3$, which laps over upon the revolving front A to form a "light-tight" joint, as shown at A, and $c^3$, Fig. 4, also by dotted line in Fig. 2.

The front frame B of the camera-box D projects beyond the walls of said box, as at $b^5$, to form a bearing for the revolving front A, also for the corner guide-plates $b'$, $b^2$, $b^3$, and $b^4$. I preferably make the frame or box-front B solid to inclose the entire front end of the box D and provide holes through it in alinement or communication with each compartment and also with the axis of the lens when the latter is caused to register with each particular compartment.

Fig. 3 is a front end sectional view of a twelve-compartment box provided with twelve holes corresponding with the said twelve compartments, the divisional walls of said compartments being indicated by dotted lines, the revolving front A, lens-carrier C, and corner-plates $b'$, $b^2$, $b^3$, and $b^4$ being omitted for clearer illustration. Fig. 4 is a longitudinal section thereof, and as the holes form a part of the box D, I denominate them in three divisions under that letter as $d'$ $d^2$ $d^3$, the said compartments being preferably arranged to correspond with the orbits or circles indicated by the dotted lines 1, 2, and 3 in Figs. 2 and 3.

Within the counterbore $a'$, formed in the face of the revolving front A, Fig. 2, I provide an opening $a^2$, which opening is the segment of a circle corresponding to the track or traverse described by the lens when moved upon and with its revolving holder or disk C to one of the three positions indicated at $a^3$ $a^4$ $a^5$, which said positions register with the orbits or circles 1, 2, and 3 traversed by the lens when revolving with the main disk front A. Hence it will be understood that when the lens is fixed in the position shown in Fig. 1, wherein it is directly over the position shown at $a^5$, Fig. 2, and the revolving front A is turned upon its axis, said lens will successively aline with the four holes and corresponding compartments under the outer orbital line 3. Then by revolving the lens-holder C until said lens registers with the position indicated at $a^4$ said lens will be upon the orbital line or circle 2, whereby the revolution of the front A will cause it to register successively with the six holes and compartments under that circle, as indicated in Fig. 3, and a final movement of the lens, with its holder C, to the position $a^3$ will fix it upon the orbital line 1, whereby revolution of the front A will cause said lens to register with the two inner holes and compartments under said inner orbit.

Any convenient means may be employed to securely lock or hold the revolving front A and revolving disk lens-holder C in any one of the several positions described while an exposure is being made. For instance, a simple bolt, as indicated at P, Fig. 5, may be employed to check or lock the revolving front A at each stop or station and a similar bolt, as indicated at R, Fig. 1, may be employed to successively engage the notches $s'$, $s^2$, and $s^3$ upon the periphery of the lens-carrying holder C to hold said lens over one of the three described orbits during the revolution of the front A.

To facilitate the convenient rotation of the camera-front A, I may sometimes employ a knob or handle G, and any convenient means may be provided for revolving the lens-carrying disk C, or revolution may be effected by taking hold of the lens. Ordinary gun-sights may be attached to the camera-box or a notched range-sight, as at H, may be used with cheaper constructions, or a regular finder may be employed for obtaining focus and range. Finally I provide an attachment or compartment at the rear end of my camera to receive the plate film or surface to be exposed, and which may be constructed or arranged in any of the well-known ways, though in Figs. 4 and 5 I have shown a lateral opening for a slide at E. Any convenient light-tight method may be employed to secure the lens-carrier C against the revolving front A; but I have preferably shown it as secured to said front by a central pin or pivot and the parts $b'$, $b^2$, $b^3$, and $b^4$.

In Fig. 6 I illustrate a modified arrangement applied to a camera-box having eight compartments or cells. In that case two orbital lines 1 and 2 suffice to cover the centers of all the eight compartments. Hence, it being necessary to change the lens to only two positions upon the revolving front A, I arrange said lens upon a slide K, which is preferably arranged to move between and under the retaining-plate I. In the example shown the lens is over the outer orbital line 2, with the stops $l'$ against the plates I. Hence to change the lens to the inner orbital line 1 it is only necessary to grasp the handle L and move the slide back against the stop $o$, when the lens will correspond to said inner orbit.

From the examples shown it will be evident that my invention is not limited to any particular number of compartments and also that various ways may be employed to make the lens conveniently and practically adjustable to different positions upon a revolving camera-front to register several successive exposures upon a single surface, plate, or film at indefinite intervals.

Having described my invention, I claim—

1. A photographic camera provided with divided longitudinal compartments and a revolving front for said compartments, a pivotally-adjusted holder upon said front and a lens carried by said holder, whereby said lens can be adjusted to different positions upon said front and can be revolved with said front upon different circles to successively register with all of said compartments.

2. In a photographic camera, the combination with a box adapted to contain a photographic surface and provided with a multiplicity of passages for the transmission of light from its face to different portions of said surface, of a front revoluble about the center before said passages, a lens-holder mounted upon said front and adjustable to different distances from its center of rotation, and a lens carried by said holder.

3. In a photographic camera, the combination with a box adapted to contain a photographic surface and provided with a multiplicity of passages for the transmission of light from its face to different portions of said surface, said passages being arranged in concentric circles, of a front revoluble about the center of said circles before said passages, a lens-holder mounted upon said front and adjustable to different distances from its center of rotation, and a lens carried by said holder.

4. A photographic camera provided with divided longitudinal compartments to form light-passages, and with a revolving front, an adjustable lens-holder carried upon said front, a lens carried by said holder, and means for retaining said front and lens-holder in position, whereby said lens can be changed to different positions and distances from the center of said front and can be revolved with said front upon different concentric circles to successively register with all of said compartments.

5. In a photographic camera divided into longitudinal compartments to form light-passages and provided with a revolving front for said passages, corner-plates $b'$ $b^2$ $b^3$ and $b^4$ for retaining the revolving front in position, a movable lens-holder carried by said front and adjustable to different distances from the center of rotation of said front, and a lens attached to said holder and movable with it, whereby, by adjusting said holder and revolving said front, the lens can be caused to register successively with said passages.

In testimony whereof I hereto affix my signature in presence of two witnesses.

WILLIAM REED SPOONER.

Witnesses:
KATE M. HILTON,
AGNES E. ROGERS.